United States Patent Office 2,978,372
Patented Apr. 4, 1961

2,978,372

METHOD FOR THE MANUFACTURE OF VINYL FILM, THE RESULTING FILM, AND PAPER SPLICED THEREWITH

Milton Alfred Bergstedt, Linden, and Robert Hopkins Lamason, Bound Brook, N.J., assignors, by mesne assignments, to Johnson & Johnson, New Brunswick, N.J., a corporation of New Jersey No Drawing. Filed Oct. 1, 1954, Ser. No. 459,847

6 Claims. (Cl. 154—43)

This invention relates to splicing of webs and more particularly of non-woven webs, e.g., paper. The invention is particularly concerned with plastic films for splicing webs under high-speed manufacturing conditions.

Paper and similar webs are made, using continuous processes, and are rolled into relatively large size rolls after completion of these processes. When such webs are to undergo further treatment, e.g., printing, they are usually rewound into rolls of suitable size. In this rewinding process defective portions are eliminated, and the adjacent ends of satisfactory material are spliced to produce continuous webs adapted for further treatment.

In the splicing process adjacent lengths of the web are overlapped, and adhesive in some form is applied across the web.

For the most part, splices using liquid adhesives are temporary expedients only, since later processing, involving the use of moisture, heat, or the aggressive action of chemicals or solvents, materially weakens such splices and in many cases disrupts the bond. Splicing of any type was difficult prior to this invention because most splices fail under conditions customary in web treatment, e.g., temperatures as high as five hundred degrees Fahrenheit and higher and various ink and treating agent drying processes. Splicing has been particularly difficult in connection with so-called uncoated or unsized paper webs as used in the magazine industry, and splices of the prior art that met or in some cases almost met the requirements of coated paper splicing have been unsatisfactory for uncoated papers and similar webs.

Some splices of the prior art have been satisfactory otherwise but have shown a tendency to block, i.e., a tendency for adjacent layers of the splicing material to stick together prior to use or to stick adjacent web layers together after use in cases where no adhesion was intended. Some of the splicing materials of the prior art have been difficult to prepare because of a tendency of the splicing film to adhere to any surface on which it could be formed, without releasing said surface. In other words, compositions that were promising otherwise for experimental use as splices could not be made to satisfaction for commercial purposes because they could not be made to release surfaces against which they were cast, under economically feasible conditions of production.

In accordance with this invention, splicing materials are provided that can be made readily, using high-speed production methods, that release surfaces against which they are cast without difficulty, yet that form satisfactory splices, even under strenuous conditions of use at very high temperatures and under other conditions of extreme strains upon splices. Using the mixture of polymers disclosed in this invention, economical splices may be provided on coated and uncoated webs, including uncoated and coated, unsized and sized paper webs. The splicing films of this invention have the further advantage of being disintegrable in a paper-making operation.

In accordance with the preferred and most satisfactory embodiment of the invention, splices are made of films composed of vinyl acetate polymers and copolymers, preferably having added thereto from about four to about twenty-five percent by weight of acrylic bonding resin as hereinafter defined, and from about five to about fifty percent of the combined weight of vinyl acetate polymers and copolymers and acrylic bonding resin, of a compatible plasticizer, together with from about one-tenth of one percent to about twenty percent by weight of said combined weight of thickener, and from about one-tenth of one percent to about five percent by weight of de-tackifier. Dyes, pigments and fillers may also be present.

By the term "acrylic bonding resin" we means to include at least one medium and/or high molecular weight emulsion polymer selected from the group consisting of methyl acrylate, methyl methacrylate, ethyl acrylate, ethyl methacrylate, propyl acrylate, propyl methacrylate, butyl acrylate, butyl methacrylate, pentyl acrylate, pentyl methacrylate, hexyl acrylate, hexyl methacrylate, octyl acrylate, and octyl methacrylate. Side chain acrylates can be used instead of the normal acrylates within this terminology, and combinations of acrylates or methacrylates or acrylates and methacrylates may also be used. Addition of the acrylate and/or methacrylate resin insures bonds to so-called uncoated or unsized papers, particularly in the magazine industry, where satisfactory splices to uncoated and unsized stock have been impossible in absence of the acrylic or methacrylic resin.

Most satisfactory compatible plasticizers are butyl glycolate, tri-ethylene glycol di-2-ethyl butyrate, cresyl phosphates such as tricresyl phosphate, triphenyl phosphate and monocresyl diphenyl phosphate, phthalic plasticizers such as dimethyl phthalate, dibutyl phthalate, diamyl phthalate, diphenyl phthalate, dimethoxy glycol phthalate, dibutoxy glycol phthalate, methyl phthalyl methyl glycolate, and butyl phthalyl butyl glycolate. The above-indicated plasticizers serve for best results, while other compatible plasticizers may be used where desirable, with varying degrees of success.

The preferred de-tackifiers are fatty alcohol sulfates, naphthalene sulfonic acids and their salts, fatty acid condensation products including fatty alkyl ester sulfonates, and fatty acid taurides and alkyl phenol ethylene oxide condensation products.

The acetate used may be the straight vinyl acetate polymer or a copolymer of vinyl acetate with another monomer having two polymerizable double bonds, such as glycol acrylate or methacrylate or similar di- or triesters of acrylic acid with poly-ols. Copolymers of vinyl acetate with cross linking monomers, including from about one to about three percent of acrylic, methacrylic or allyl esters, may be used. In place of vinyl acetate polymers and copolymers, the corresponding vinyl propionate and vinyl butyrate polymers and copolymers may be used. The preferred polymers have a molecular weight in the range of from about 80,000 to about 150,000.

The preferred thickeners are sodium or ammonium carboxy methyl cellulose, hydroxy ethyl cellulose, methyl cellulose, gelatin, glue, dextrines, sodium alginate, and water-soluble gums, e.g., gum tragacanth, locust bean gum or gum arabic. If the thickeners used encourage growth of bacteria or fungi, a bactericide, e.g., the methyl ester of parahydroxy benzoic acid, may be present in minor amount.

The splicing film is deposited, preferably from an aqueous emulsion or dispersion, on a supporting surface such as polyethylene, metal, paper, e.g., eight-pound kraft paper calendered with approximately one to about one and one-half mils polyethylene-wax composition, or varnished calendered kraft paper, e.g., of the weight given, varnished with China-wood oil varnish having a wax content of up to about fifteen percent by weight. Presence of the thickening agent assures an even film free of lumps and streaks that are fatal to high-speed paper or similar web handling. The emulsion is dried on the supporting surface and may be stripped from it to be rolled into tapes ready for use in splicing, splicing films having thicknesses of from about five mils to about one-quarter of one mil are preferred because in most subsequent web treatments thicker splicing materials interfere with smooth and economical operation. A thickness of about one and one-half mils is most preferred; however, thicker splicing films may be made readily, using the methods of the invention.

After casting of the film and drying, a separator sheet may be interposed between layers of the splicing material to prevent them from adhering to one another. The separator sheet may comprise a strip of castor-oil-impregnated- or polyethylene-coated paper or any other suitable sheet having a surface to which the splicing film will not adhere.

The following embodiments of the invention are furnished by way of example only, and not to limit it.

*Example*

A film of the following dry composition was prepared from aqueous emulsion:

| | Parts by weight |
|---|---|
| Polyvinyl acetate as defined above, either pure polymer or copolymer with two percent cross-linking agent | 85 |
| Butyl acrylate polymer, medium high molecular weight, or pentyl acrylate | 15 |
| Water-soluble dye | 0.5 |
| De-tackifier, e.g., fatty alcohol sulfate or alkyl phenol ethylene oxide condensation de-tackifier | 1.0 |
| Tri-ethylene glycol di-2-ethyl butyrate or dibutyl phthalate | 20 |
| Hydroxy ethyl cellulose thickener or gum tragacanth thickener | 10 |

The dispersion was cast to form a film approximately three mils thick, using one of the casting surfaces mentioned above. The film was air-dried as fast as was possible without blistering, and cut into strips one-half inch wide.

Strips made in accordance with the above procedure were then disposed between overlapped pieces of uncoated paper, coated paper, and non-woven, adhesive bonded cotton web in separate experiments. The paper ends were sealed, using the splicing film and an iron maintained at a temperature of 325 degrees Fahrenheit. The splices showed ability to fuse below about 350 degrees Fahrenheit. None of the splices pulled apart when tested under stresses up to those corresponding to the tensile strength of the webs. The splices presented a smooth, unwrinkled appearance. The spliced area was subjected to temperatures up to above five hundred degrees Fahrenheit until the webs were scorched, without effect upon the splice. In addition, the draw of the sheet remained flat and even, occasioning no disturbance in the printing operation.

The splicing film was improved over all splicing films of the prior art because there was no unevenness in the cast film, no breaking of the emulsion, and the slip sheet may be avoided with this formula.

In accordance with this specification, the ingredients of the film may be varied by substituting any of the substitute ingredients within the proportions listed above in the example. It should be noted particularly that good bonds can be obtained on coated or sized papers only, but not on uncoated papers, in absence of the acrylate or methacrylate resin within the specific proportions given. It is surprising that the acrylate or methacrylate resin, when used within these proportions, does give good bonds to uncoated and unsized stock which cannot be obtained even when copolymers of vinyl esters with acrylates are used in absence of the acrylic or methacrylic polymers per se.

Many other embodiments of the invention will be obvious to those skilled in the art and are included within the inventive concept.

The claims are:

1. The method for the manufacture of material for splicing paper, said material fusing at a temperature below about 350° Fahrenheit, being capable of withstanding short interval exposure to high temperatures, and being disintegrable in paper-making operations; said method comprising, depositing an aqueous emulsion of a splicing composition on a supporting surface, drying said splicing composition on said supporting surface, said splicing composition comprising one hundred parts by weight of a fusible vinyl component, from about five to about twenty parts by weight of a compatible plasticizer, from about one-tenth of one part by weight to about twenty parts by weight of thickener, and from one-tenth of one part to about five parts by weight of detackifier; said fusible vinyl component composed of from about four to about twenty-five percent by weight of a fusible acrylate resin selected from the group consisting of polymers of methyl acrylate, methyl methacrylate, ethyl acrylate, ethyl methacrylate, propyl acrylate, propyl methacrylate, butyl acrylate, butyl methacrylate, pentyl acrylate, pentyl methacrylate, hexyl acrylate, hexyl methacrylate, octyl acrylate, and octyl methacrylate, and from about ninety-six percent to about seventy-five percent of a fusible vinyl resin selected from the group consisting of (a) polymers of a single monomer selected from the group consisting of vinyl acetate, vinyl propionate and vinyl butyrate; and (b) copolymers of a monomer selected from the group consisting of vinyl acetate, vinyl propionate and vinyl butyrate and a cross-linking monomer, said cross-linking monomer being in an amount from 1 to 3 percent by weight.

2. The method in accordance with claim 1 wherein the fusible vinyl resin is a vinyl acetate polymer.

3. A film manufactured in accordance with the method of claim 1.

4. A film manufactured in accordance with the method of claim 2.

5. A film in accordance with claim 3, having a thickness of about one-fourth of one mil to about five mils.

6. A paper sheet having a splice composed of two ends bonded with the film of claim 3.

References Cited in the file of this patent

UNITED STATES PATENTS

| 2,123,474 | Redman | July 12, 1938 |
| 2,496,976 | Barney | Feb. 7, 1950 |
| 2,520,086 | Ham | Aug. 22, 1950 |
| 2,587,833 | Germain | Mar. 4, 1952 |